US006459232B1

(12) United States Patent
Lai

(10) Patent No.: US 6,459,232 B1
(45) Date of Patent: Oct. 1, 2002

(54) SPACECRAFT POWER SYSTEM

(75) Inventor: Shu T. Lai, Burlington, MA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 10/077,991

(22) Filed: Feb. 20, 2002

(51) Int. Cl.[7] .............................................. H01M 10/46
(52) U.S. Cl. ..................................................... 320/101
(58) Field of Search ........................ 320/101; 244/159, 244/158, 173; 335/216

(56) References Cited

U.S. PATENT DOCUMENTS

| | | | | |
|---|---|---|---|---|
| 4,078,747 A | * | 3/1978 | Minoviych | 244/159 |
| 5,052,638 A | * | 10/1991 | Minovitch | 244/53 |
| 5,594,325 A | | 1/1997 | Manner | 323/282 |
| 5,686,203 A | | 11/1997 | Idota et al. | 429/194 |
| 5,695,888 A | | 12/1997 | Gage | 429/57 |
| 6,034,506 A | | 3/2000 | Hall | 320/117 |
| 6,042,964 A | | 3/2000 | Sharma et al. | 429/112 |
| 6,049,190 A | | 4/2000 | Canter et al. | 320/101 |
| 6,116,544 A | | 9/2000 | Forward et al. | 244/158 R |
| 6,157,161 A | | 12/2000 | Canter et al. | 320/101 |
| 6,260,808 B1 | | 7/2001 | Bodeau et al. | 244/173 |

OTHER PUBLICATIONS

Hastings, D.E. and Garrett, H.B., Spacecraft–Environment Interactions, Cambridge University Press, Cambridge, UK, 1996 Chapter 5, Table 5.4, p. 171, published by Lai, 1991.

Tribble, A., The Space Environment, Princeton University Press, Princeton, NJ., 1995, Chapter 4.

Lai, S.T., An improved Langmuir probe formula for modeling satellite interactions with near geostationary environment, J. Geophys. Res., vol. 99, 459–468, 1994.

Lai, S.T., Spacecraft charging thresholds in single and double Maxwellian space environments, IEEE Trans. Nucl. Sci., vol. 19 pp. 1629–1634, 1991.

Lai, S.T. and Della–Rose, D, Spacecraft charging at geosynchronous altitudes; New evidence of the existance of critical temperature, J. Spacecraft & Rockets, vol. 38, No. 6.,922–928 Nov. 2001.

Lai, S.T., An overview of electron and ion beam effects in charging and discharging of spacecraft, IEEE Trans. Nuclear Sci., vol. 36, No. 6. pp. 2027–2032, 1989.

Lai, S.T., A critical overview on spacecraft charging control methods, Proc. 6th Spacecraft Charging Conf., pp. 50–55, Hanscom AFB, MA 2001.

* cited by examiner

Primary Examiner—Edward H. Tso
Assistant Examiner—Lawrence Luk
(74) Attorney, Agent, or Firm—Stephen A. Sayeedi

(57) ABSTRACT

A spacecraft power system utilizing a novel method for recharging batteries utilizing the ambient space plasma and at least two separate surface materials having different material properties is disclosed. This power system provides increased power and reduces electrical potential build-up of the spacecraft, thereby reducing the power needed from solar array panels and protecting sensitive electrical components and telemetry signals from damage or disturbance.

11 Claims, 3 Drawing Sheets

CRITICAL TEMPERATURES, eV

| MATERIAL | ISOTROPIC | NORMAL |
|---|---|---|
| Mg | 400 | — |
| Al | 600 | — |
| Kapton | 800 | 500 |
| Al oxide | 2,000 | 1,200 |
| Teflon® | 2,100 | 1,400 |
| Cu-Be | 2,100 | 1,400 |
| Glass | 2,200 | 1,400 |
| $SiO_2$ | 2,600 | 1,700 |
| Silver | 2,700 | 1,200 |
| Mg oxide | 3,600 | 2,500 |
| Indium oxide | 3,600 | 2,000 |
| Gold | 4,900 | 2,900 |
| Cu-Be (activated) | 5,300 | 3,700 |
| $MgF_2$ | 10,900 | 7,800 |

FIG. 1

SPACECRAFT POWER SYSTEM

RIGHTS OF THE GOVERNMENT

The invention described herein may be manufactured and used by or for the Government of the United States for all governmental purposes without payment of any royalty thereon.

BACKGROUND

1. Field of the Invention

The present invention relates to the field of spacecraft power sources and charging effects on spacecraft, and in particular, the discharging of spacecraft and charging of batteries in a plasma field.

2. Description of the Related Art

The total weight of any satellite or other spacecraft is proportional to the launch cost and must therefore be minimized. Spacecraft power systems, therefore, typically rely primarily on solar arrays. However, spacecraft within the solar system may travel through two distinct phases—a non-eclipse phase, where the sun transfers energy directly to the spacecraft, and an eclipse phase, where the spacecraft is fully or partially obscured from the sun. During the non-eclipse phase, power requirements are generally met or exceeded through the solar arrays. However, during the eclipse phase, where the solar arrays are ineffective at supplying power, at least one battery is often needed to meet power requirements.

The use of rechargeable batteries on spacecraft is known in the art. See, for example, U.S. Pat. No. 6,157,161, issued Dec. 5, 2000 to Canter et al. Such systems typically utilize energy derived from the solar arrays during non-eclipse phases, in excess of power requirements, to recharge the batteries for later use during eclipse phases. The solar array panels must therefore be larger than necessary to meet typical power requirements during the eclipse phases. This increases the weight and often the complexity of the spacecraft, resulting in higher costs. In addition, solar array panels are exposed to potentially harmful elements, such as space debris, leading to arcing and may potentially be destroyed or damaged. Spacecraft anomalies due to solar array degradation, which often occurs suddenly, are commonly reported. By contrast, batteries located inside spacecraft are better protected by the spacecraft; therefore, spacecraft components dependent on battery power are more likely to receive the power needed for longer periods of time than those dependent on solar arrays.

Spacecraft are surrounded in space by plasma in which atoms and molecules have been dissociated into positively charged ions and negatively charged electrons. In other words, plasma is generally composed of ions and "free electrons," which are no longer bound to their atoms or molecules.

Ions are considerably heavier and slower than electrons. This accounts for the fact that while space plasma is neutral, the ion current at a given location will be smaller than the electron current. At geosynchronous altitudes, for example, the ambient electron flux is approximately two orders of magnitude (100 times) larger than that of ions.

A spacecraft initially exposed to space plasma will therefore begin to accumulate a negative charge. This negative charge will then begin to repel further electrons while attracting the positive ions. At some point, the spacecraft reaches equilibrium where no further charging of the spacecraft occurs and the surface potentials are in equilibrium. This process occurs rapidly, typically over a period of milliseconds, and generally results in a net negative potential of the spacecraft. By way of example, the time required to reach equilibrium—which is mostly a function of surface capacitance—is approximately one millisecond for typical satellites at geosynchronous altitude.

The negative potential may reach thousands of volts during active periods, such as geomagnetic storms and substorms. During geomagnetic substorms, which occur almost daily, the electrical current intercepted by typical spacecraft is typically two orders of magnitude higher than during quite periods. The current rises even higher during geomagnetic storms—which occur several times each year, depending on the sun's activity cycle, and likely follow significant solar eruptions of hot plasmas or coronal mass ejections toward the Earth. The spacecraft surface charging effect occurs in both eclipse and non-eclipse phases.

The current intercepted is proportional to the exposed surface area of the spacecraft. This negative charging is often harmful to onboard electronics, telemetry, and spacecraft survivability. Sudden onset of spacecraft charging is particularly harmful, as it is more difficult if not impossible to take appropriate action to mitigate the effects.

In addition to "absolute charging," where the entire spacecraft potential differs from the ambient plasma, "differential charging" frequently occurs where parts of the spacecraft are charged to different potentials relative to each other. Both absolute and differential charging are potentially harmful to spacecraft components and even to the survivability of the spacecraft. It is therefore desirable to mitigate the harmful effects of spacecraft charging by discharging the spacecraft.

Accordingly, there is a need for a lightweight spacecraft power system, protected from the harmful effects of space, that provides sufficient power in both eclipse and non-eclipse phases and that mitigates harmful spacecraft charging effects on system components.

SUMMARY

To achieve these and other objects, the present invention provides a spacecraft power system that discharges excess voltage potential on the spacecraft while re-charging on-board batteries, thereby resulting in both an increased spacecraft power supply and a reduction in the potential harm to spacecraft components.

Empirical evidence from a variety of satellites (e.g., ATS-5, ATS-6, SCATHA, and Los Alamos National Laboratory geosynchronous satellites LANL-1989-046, LANL-1990-095, LANL-1994-084, and LANL-97A) indicates the existence of a critical or threshold temperature ($T_c$) at which spacecraft charging onsets. The concept of critical temperature, developed by the inventor, may be determined for any given material by methods known in the art. It can be further shown that the critical temperature is independent of the plasma density in a Maxwellian space plasma. See "Spacecraft Charging at Geosynchronous Altitudes: New Evidence of Existence of Critical Temperature," S.T. Lai et al., *Journal of spacecraft and Rockets*, vol. 38, no. 6, pp. 922–928, November–December, 2001, which is herein incorporated by reference herein. The critical temperature depends on the surface properties. Once the critical temperature is reached, there is a strong correlation between electron temperature and spacecraft potential.

By utilizing different materials on a spacecraft surface, each having corresponding differences in the critical temperature, each material surface will generally have an electrical potential relative to the other material surfaces. For example, one embodiment includes a spacecraft with an aluminum oxide ($AL_2O_3$) surface on one side and a silicon dioxide ($SiO_2$) surface on the other side. Above the critical temperature, these materials will exhibit a potential relative to each other. See FIG. 3, which illustrates the approximate relative potential between these two surface materials, as well as for Magnesium Fluoride ($MgF_2$) and Kapton, for electron temperatures up to 6.0 keV. The graph presented in FIG. 3 assumes a spherical satellite positioned in the eclipse phase where the electron temperature is equal to the ion temperature and where the ambient electron flux is ten times the ambient ion flux.

By connecting each surface material to a battery or batteries, the excess electrical charge can be used to recharge the battery power supply. As the electrical charges on the surfaces are channeled to the battery power supply, the surface potential decreases accordingly. In this manner, the natural space plasma energy can be harnessed to provide power for the spacecraft while the potential harm from differential surface charge potentials is substantially reduced.

The material surfaces may be selected and designed to best accommodate any particular spacecraft, depending on the spacecraft environment, orientation with respect to the sun and other bodies, the potential harm due to spacecraft charging, and on the particular power needs of the spacecraft. The shape and size of the material surfaces used to recharge battery power may be adjusted for individual spacecraft needs. In alternative embodiments, multiple surface materials may be used to recharge different types of batteries having different power needs.

In one embodiment, a fuse is used in the current flow pathways between the spacecraft surface materials and rechargeable batteries. In other embodiments, an adjustable resistance is installed in the current flow pathways. These devices may be used to control the current flow and protect the batteries, respectively, particularly during exceptionally severe geophysical storms.

The present invention provides means for harnessing the ambient space plasma, thereby reducing the power requirements and potentially the size of the solar arrays. A reduction in the size of the solar array panels may reduce the total weight of the spacecraft, particularly those spacecraft that would otherwise utilize battery power sources. The present invention may supplement the solar arrays and can be used during eclipse and on the shadowed side of a spacecraft even during daytime.

The rechargeable batteries of the present invention are protected by the spacecraft and, compared with solar array panels, are consequently less likely to be damaged from the space environment. Accordingly, the power system of the present invention is more reliable and may increase spacecraft lifetimes.

The present invention allows spacecraft to harness power from the ambient space plasma during both eclipse and non-eclipse phases. In addition, the quantity of the accumulated battery charge can be designed for particular needs by varying the battery capacitances and exposed surface areas of the particular materials connected to the batteries. Further flexibility is provided through use of fuses and resistors in electrical pathways between the individual surface materials exposed to the ambient space plasma and between the exposed surface materials and the rechargeable batteries.

Another advantage of the present invention is the reduction of potentially harmful electrical charge buildup of spacecraft. This reduces the likelihood of arcing, telemetry interference, and damage to electrically biased components and may also increase the lifetimes of system components as well as the spacecraft itself.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming that which is regarded as the present invention, the features, objects, and advantages of the present invention can be more readily ascertained with reference to the following description, in conjunction with the accompanying drawings, in which:

FIG. 1 is a table of critical temperatures, measured in electron volts (eV), for materials typically used on spacecraft surfaces;

DESCRIPTION

Figure 2:
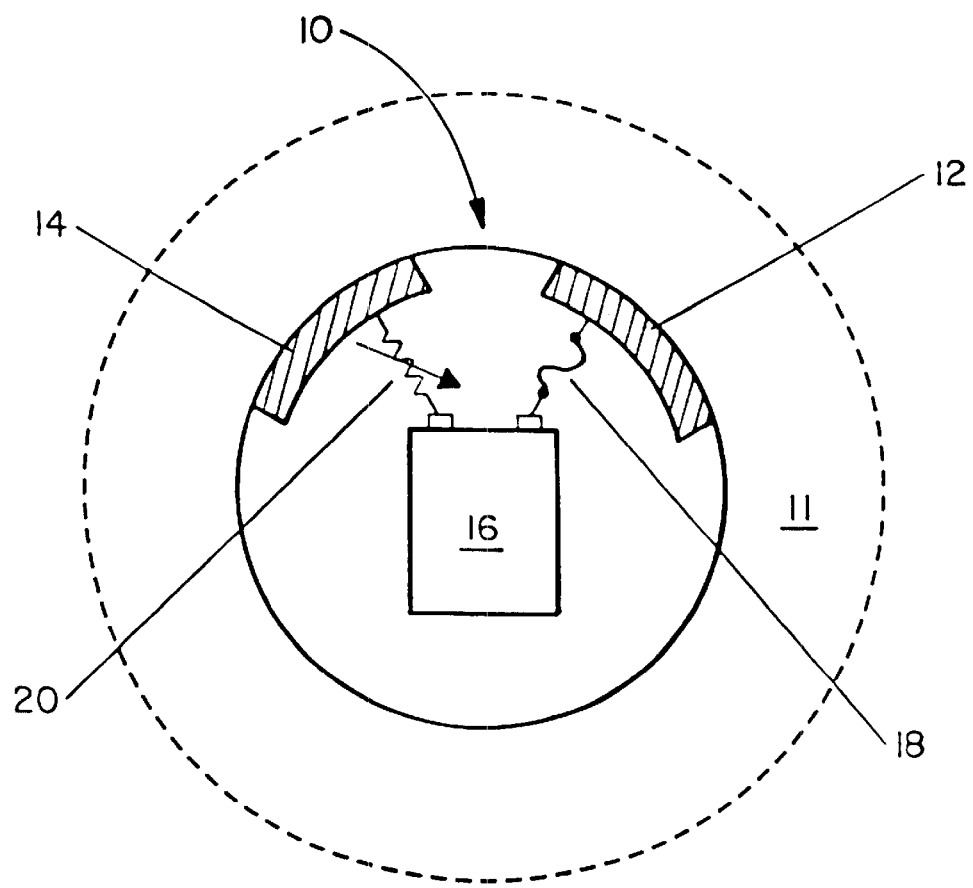
FIG. 2 is a schematic diagram illustrating the features of one embodiment.
Figure 3:
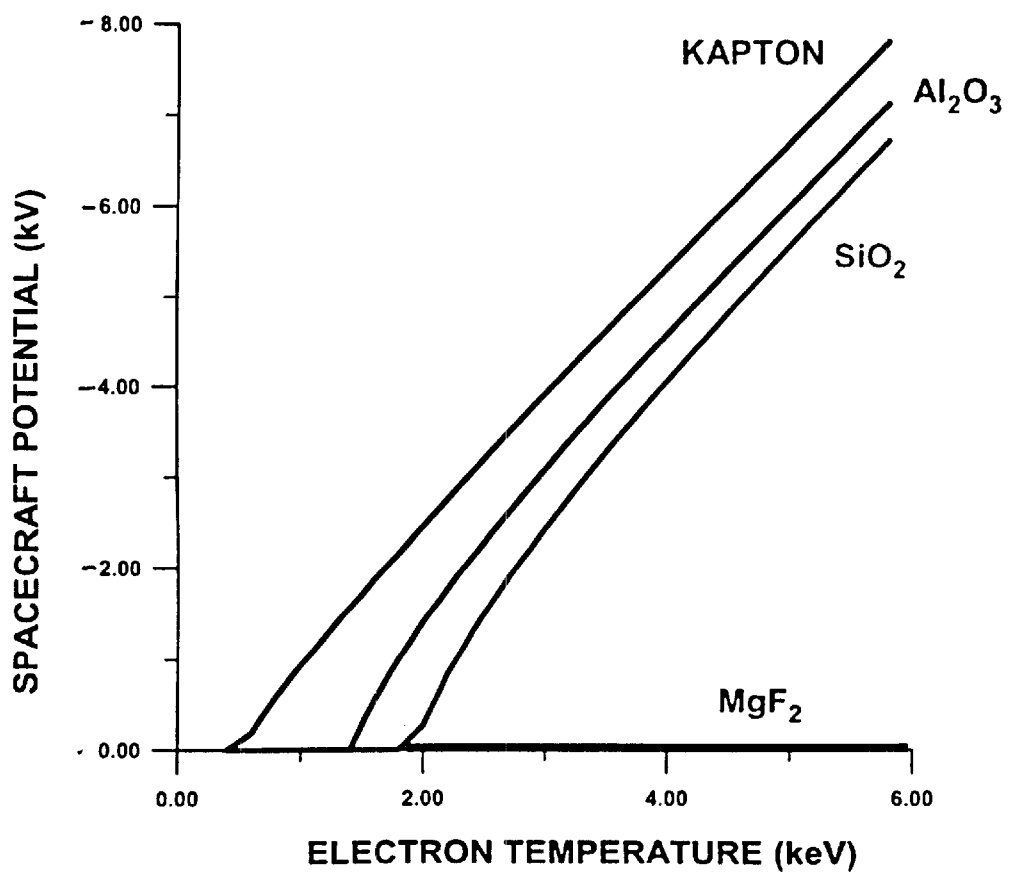
FIG. 3 is a graph of spacecraft potential as a function of electron temperatures for four spacecraft surface materials.

Referring to the drawings, and FIG. 2 in particular, the spacecraft 10 depicts one embodiment of the invention, immersed in space plasma 11, utilizing two separate surface materials 12 and 14 in electrical connection with at least one rechargeable battery 16. The first surface material 12 is selected for the specific spacecraft mission needs (such as, for example, a material listed in FIG. 1). A second surface material 14, having a different critical temperature than that of the first surface material 12, is likewise selected as is appropriate for the specific spacecraft mission needs.

Each surface material 12 and 14 is exposed to the ambient space plasma 11 and will therefore accumulate a charge, whenever the temperature exceeds the critical temperature for the particular surface, relative to the plasma 11 and to the other surface material. The charging occurs from bombardment of positively charged ions and negatively charged electrons within the plasma 11. The electrons, which are highly energetic compared to the ions, bombard the material surfaces 12 and 14 resulting in a corresponding build-up of negative potential. This initial negative potential is generally insufficient to repel the incoming electrons, particularly during geomagnetic storms and substorms—where the incoming electrons have higher energies, resulting in an increased net negative potential for each surface material 12 and 14. This is traditionally referred to as spacecraft charging.

The negative potential accumulated on each surface material 12 and 14 is a function of the critical temperature of each particular surface material. Critical temperatures are provided in FIG. 1 for typical materials used for external spacecraft surfaces. The surface materials 12 and 14 are appropriately positioned on the spacecraft 10 for mission requirements. The surface materials must not be in direct electrical connection with each other; though they both must be in electrical communication with the rechargeable battery source 16. Any suitable insulating material (not shown) may be used to isolate the accumulation of charge on each surface material 12 and 14.

The surface charges at surface materials 12 and 14 are then used to re-charge the battery source 16, which is in electrical communication with both surfaces 12 and 14. The battery source 16 thereby stores power for later consumption, when needed, and may be used to supplement solar arrays (not shown), especially during eclipse phases. In one embodiment, a fuse 18 and variable resistor 20 are installed in at least one of the current flow pathways between surface material 12 and 14 and the battery source 16. The fuse 18 and resistor 20 are used to protect the battery source 16, during periods of high electrical energies—such as during geomagnetic storms and substorms—and to control current flow, respectively. In alternative embodiments, the fuse 18 and resistor 20 may both be installed in each electrical pathway between the surface materials 12 and 14 and the battery source 16.

In one embodiment, the surface materials 12 and 14 may be positioned on opposite sides of the spacecraft, in such way that one of the surface materials is exposed to sunlight while the other surface material is not. This may act to increase the effectiveness of the power system.

Although the incoming electrons in the plasma 11 are energetic, the current flow is relatively low—typically on the order of ten micro-amps per second, depending on the properties of the surface materials, the surface areas of the exposed materials, and the conditions of the plasma 11. During geomagnetic storms and substorms, for example, the current flow will increase. The battery source 16, which has a relatively high capacitance, will therefore not charge to the same voltage potential as the difference in charge potential between the two surface materials 12 and 14. In one embodiment, the battery source 16 includes a twelve-volt battery. With continued operation of the spacecraft 10 over periods of months, without regard to any increased rates due to geomagnetic storms or substorms, charge accumulations of approximately 300 Coulombs per year ($3 \times 10^7$ seconds/year times 10 micro-amps/second) may be achieved—where the surface materials 12 and 14 are maintained at all times in the eclipse phase. Higher accumulated charges may be achieved for certain spacecraft missions, which would travel in both eclipse and non-eclipse phases.

Characteristics of the described and illustrated embodiments are intended for illustrative purposes and are not to be considered limiting or restrictive. It is to be understood that various adaptations and modifications may be made to the embodiments presented herein by those skilled in the art without departing from the spirit and scope of the invention, as defined by the following claims and equivalents thereof.

That which is claimed is:

1. A spacecraft power system, comprising:
   a first surface material of a spacecraft exposed to an ambient space plasma whereby said first surface material accumulates a first charge potential relative to the space plasma where the temperature exceeds the critical temperature;
   a second surface material of the spacecraft, having a different critical temperature than said first surface material, exposed to the space plasma whereby said second surface material accumulates a second charge potential, relative to both the first charge potential and to the space plasma where the temperature exceeds the critical temperature; and
   a rechargeable battery source in electrical communication with said first surface material and said second surface material for accumulating electrical charge.

2. The spacecraft power system as defined in claim 1, further comprising:
   a fuse; and
   means for electrically connecting said fuse between said rechargeable battery source and said first surface material whereby said fuse blocks any electrical flow between said first surface material and said battery source whenever the electrical flow exceeds a predetermined value.

3. The spacecraft power system as defined in claim 1, further comprising:
   a variable resistor; and
   means for electrically connecting said variable resistor between said rechargeable battery source and said first surface material whereby said variable resistor may increase the electrical resistance of electrical flow between said first surface material and said rechargeable battery source.

4. The spacecraft power system as defined in claim 1, further comprising:
   a variable resistor in electrical communication between said first surface material and said rechargeable battery source; and
   a fuse in electrical communication between said first surface material and said rechargeable battery source.

5. The spacecraft power system as defined in claim 1, further comprising:
   a variable resistor in electrical communication between said first surface material and said rechargeable battery source;
   a variable resistor in electrical communication between said second surface material and said rechargeable battery source;
   a fuse in electrical communication between said first surface material and said rechargeable battery source; and
   a fuse in electrical communication between said second surface material and said rechargeable battery source.

6. A method of harnessing power from an ambient space plasma, comprising the steps of:
   exposing a first surface material to an ambient space plasma;
   exposing a second surface material, having a different critical temperature than said first surface material, to the ambient space plasma; and
   providing at least one battery, having non-zero capacitance, in electrical communication between said first surface material and said second surface material.

7. The method as defined in claim 6, further comprising the step of controlling current flow by inserting a variable resistor between said first surface material and said at least one battery.

8. The method as defined in claim 6, further comprising the step of protecting said at least one battery from excessive current by inserting a fuse between said first surface material and said at least one battery.

9. A method of discharging potentially harmful electrical charge potential from a spacecraft in an ambient space plasma, comprising the steps of:
   exposing a first surface material to the ambient space plasma;
   exposing a second surface material, having a different critical temperature than said first surface material, to the ambient space plasma; and
   providing at least one battery, having non-zero capacitance, in electrical communication between said first surface material and said second surface material.

10. The method as defined in claim 9, further comprising the step of controlling current flow by inserting a variable resistor between said first surface material and said at least one battery.

11. The method as defined in claim 9, further comprising the step of protecting said at least one battery from excessive current by inserting a fuse between said first surface material and said at least one battery.

* * * * *